Feb. 26, 1963   L. P. McGINNIS   3,079,454
THERMAL BATTERY CELL
Filed June 19, 1959

INVENTOR.
Laurence P. McGinnis 3,079,454
THERMAL BATTERY CELL
Laurence P. McGinnis, Adelphia, Md., assignor to the United States of America as represented by the Secretary of the Army
Filed June 19, 1959, Ser. No. 821,614
1 Claim. (Cl. 136—4)
(Granted under Title 35, U.S. Code (1952), sec. 266)

The invention described herein may be manufactured and used by or for the Government for governmental purposes without the payment to me of any royalty thereon.

This invention relates to thermal batteries in general, and more specifically to an improved thermal cell which is capable of producing a relatively high constant voltage for a relatively long period of time.

Thermal battery cells in general consist of a series of dry plates or discs which are pressed together so that a small, compact voltage source is provided. These plates or discs are composed of dry materials which are capable of coacting to generate a voltage when the cell is activated by heating to a temperature sufficient to cause fuzing of the electrolyte in the plates or discs. Thermal batteries consisting of a series of thermal cells have found extensive use in ordnance missile applications because they provide a compact source of voltage which is needed to energize vacuum tubes and other electrical equipment in the missile.

Many types of commercial vacuum tubes used in ordnance missiles are designed to operate at a constant voltage of 1.5 volts. Also these tubes must continue to operate for periods of at least 30 seconds. As a result, a compact thermal battery which produces electrical energy for these tubes or other types of electrical equipment must provide a substantially constant voltage of 1.5 volts for periods of 30 seconds or more after the battery is initiated.

Known prior art thermal batteries either produce a voltage which is greater than or which is less than the desired 1.5 volts. When the battery produces a voltage which is either greater or less than 1.5 volts, some additional means has to be provided which will either decrease or increase the voltage produced by the thermal battery so that the tubes or equipment receive a substantially constant 1.5 volts.

Therefore, it is an object of this invention to provide a compact thermal battery cell which will produce a constant voltage of 1.5 volts for a period of at least 40 seconds after the battery is activated under normal operating load.

It is another object of this invention to provide a thermal battery cell which is capable of providing any predetermined voltage of between 1.3 and 1.7 volts at a current density of approximately 28 milliamperes per square centimeter.

An additional object of this invention is to provide a compact thermal battery cell which is composed of non-strategic materials and which will produce a relatively constant discharge voltage of any predetermined value between 1.3 and 1.7 volts under normal load of 3.5 ohms.

Thermal battery cells can be made in accordance with this invention, which will maintain for 40 to 50 seconds a uniform predetermined voltage between 1.3 and 1.7 volts, the voltage being determined by the relative ratios of gamma and alpha ferric oxide present in the battery depolarizer plates. Using gamma ferric oxide alone, or in combination with alpha ferric oxide in the depolarizer plate of a cell which has a magnesium anode, a pair of nickel cathodes, and a pair of electrolyte discs of potassium and lithium chloride in a eutectic mixture, any desired voltage discharge of between 1.3 and 1.7 volts may be easily obtained when the battery cell is under a normal load of 3.5 ohms.

The specific nature of the invention, as well as other objects, uses and advantages thereof, will clearly appear from the following description and from the accompanying drawing, in which.

Figure 1:
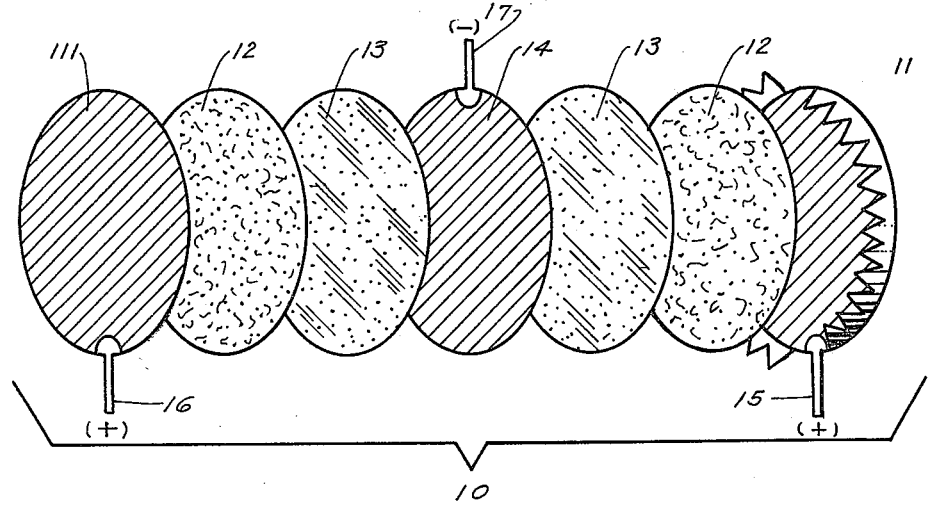
FIG. 1 shows the stacking arrangement of the plates which form the improved thermal battery cell of this invention.

The construction of the unique thermal cell 10 of this invention is illustrated in FIG. 1. Cell 10 comprises a nickel cup 11 to which an electrical lead wire 15 is soldered. Cup 11 is adapted to encase the plate or discs which comprise thermal cell 10 while forming one cathode of the cell. The other cathode consists of a pure nickel disc 111 to which lead wire 16 is soldered.

Positioned between cathodes 11 and 111 are a pair of depolarizer plates 12, a pair of electrolyte plates 13, and a negative plate or anode 14. The electrolyte plates 13 consist of a dry eutectic mixture of 56% by weight of potassium chloride and 44% by weight of lithium chloride. A glass cloth is impregnated with the mixture and supports the mixture in the plate or disc form shown. Anode 14 consists of magnesium and has a lead wire 17 affixed to its edge.

Depolarizer plates 12 are composed of gamma $Fe_2O_3$ which is applied to a glass fiber base by the following method. A slurry consisting of 3.14 g. of powdered gamma $Fe_2O_3$ (approximately 200 mesh), 0.004 g. of glass fibers, 0.5 ml. of a wetting agent, such as acetone, and 500 ml. of water, is mixed for 30 seconds in a Waring Blendor. As disclosed in U.S. Patent No. 2,694,565 and the publication of N. V. Sidgwick entitled, "Chemical Elements and Their Components," Oxford University Press (1951), $Fe_3O_4$ (magnetite) is converted to gamma $Fe_2O_3$ by heating the $Fe_3O_4$ in a temperature range of from 149° C. to 600° C.

The slurry is then poured into a Buchner funnel fitted with a sheet of #40 Whatman filter paper 12.5 cm. in diameter, and the excess water removed by suction. The resulting mat or paper is removed from the funnel by compressed air, dried in an oven for 15 minutes at 120° C., and stored in a dessicator overnight. With the filter paper still adhering to the mat of depolarizer paper, pieces of depolarizer of the desired size and shape are stamped out. Just before use the filter paper is stripped off and discarded, and the remaining mat forms a depolarizer plate 12. At least eight depolarizer discs can be cut from the resulting mat.

After stacking the plates in the order shown, the edges of cup 11 are but over in a press and the cell is compressed under a pressure of 5 tons per square inch.

Figure 2:
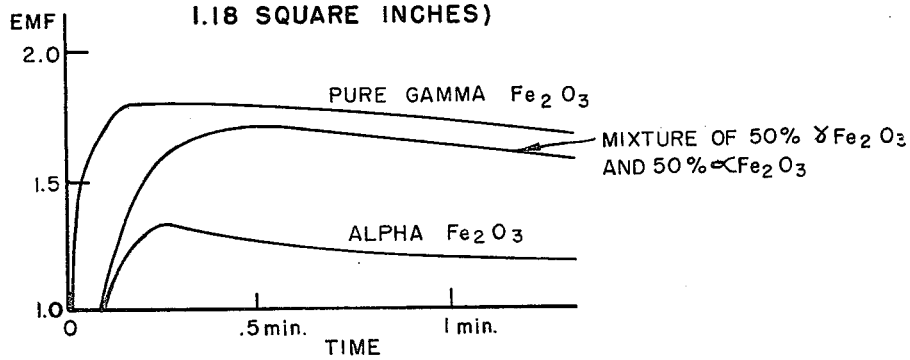
FIG. 2 shows graphically the discharge characteristics of the thermal cell of this invention.

Referring now to FIG. 2, there are shown graphically two curves which show the discharge voltage characteristics of the thermal cell 10 of this invention when it is heated in a furnace of approximately 420° centigrade. As can be seen, when pure gamma ferric oxide is used as a depolarizer the thermal cell will discharge at a relatively constant voltage of at least 1.7 volts. When 50% of the slurry consists of alpha ferric oxide and 50% gamma ferric oxide, the discharge voltage of cell 10 is 1.5 volts and the discharge is substantially uniform for a period of at least 40 seconds. If activation of the thermal cell 10 is effected by heat powder, the time interval between battery activation and the voltage output of 1.5 volts is less than one second.

Those skilled in the art will appreciate the advantage of being able to produce a constant predetermined voltage level by merely combining in the slurry mixture various proportions of alpha and gamma ferric oxide. When pure alpha ferric oxide is used without any gamma ferric oxide in the slurry described above, a substantially constant discharge voltage of 1.3 volts is produced. This voltage value is however too low for ordnance missile applications which require 1.5 volts. Both alpha ferric oxide and gamma ferric oxide are well known ferric oxide compounds. The important difference in their crystalline structures is believed to account for their difference in behavior when these two compounds are used in depolarizer plates.

It will be apparent that the embodiments shown are only exemplary and that various modifications can be made in construction and arrangement within the scope of the invention as defined in the appended claim.

I claim as my invention:

An improved thermal cell comprising a pair of nickel cathodes, one cathode of said pair being substantially cup-shaped and forming the outer casing for said cell, the other cathode being substantially disc-shaped and enclosed by said one cathode, a pair of depolarizer discs between said cathodes each depolarizer disc comprising a sheet of powdered gamma ferric oxide and glass fibers in mixture, a pair of electrolyte discs between said depolarizer discs and composed of a eutectic mixture of potassium and lithium chloride, and a magnesium disc positioned between said electrolyte discs, said magnesium disc forming the anode of said cell.

References Cited in the file of this patent

UNITED STATES PATENTS

| | | |
|---|---|---|
| 165,210 | Clamond et al. | July 6, 1875 |
| 1,134,093 | Bauer | Apr. 6, 1915 |
| 1,288,722 | Snelling | Dec. 24, 1918 |
| 1,303,453 | Benner et al. | May 13, 1919 |

FOREIGN PATENTS

| | | |
|---|---|---|
| 795,910 | Great Britain | June 4, 1958 |

OTHER REFERENCES

Goodrich et al.: "J. Electrochem. Society," vol. 99, No. 8, pages 207C, 208C, August 1952.

McKee: "Proceedings Tenth Annual Battery Research and Development Conference," Power Sources Division, U.S. Signal Corps Engineering Laboratories, Fort Monmouth, N.J., pages 26–28, May 23–24, 1956.